Figure 1:
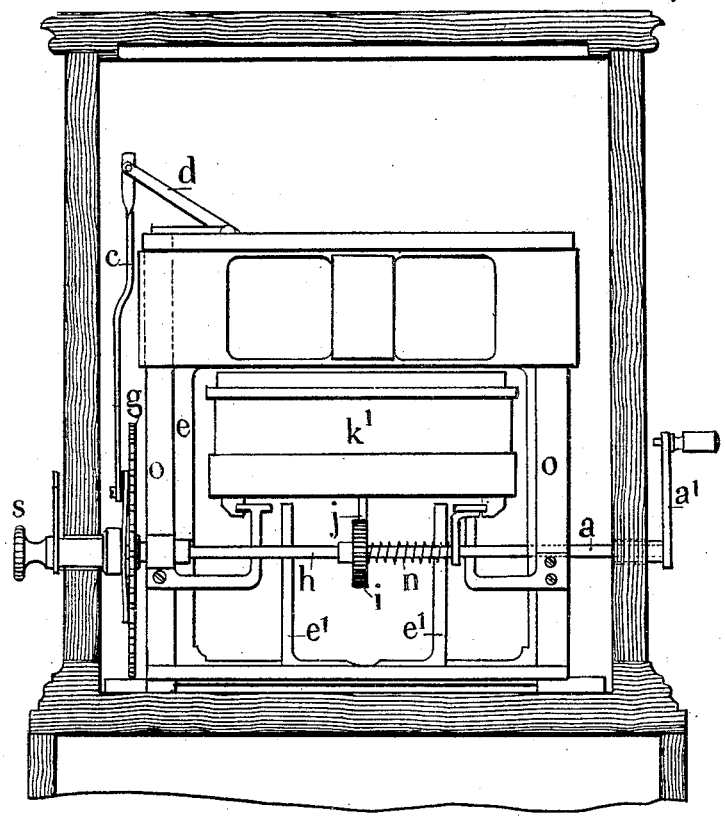

J. RICHARD.
APPARATUS FOR VIEWING STEREOSCOPIC OR OTHER PICTURES.
APPLICATION FILED FEB. 5, 1908.

940,479.

Patented Nov. 16, 1909.

7 SHEETS—SHEET 1.

WITNESSES:
W. M. Avery
J. P. Davis

INVENTOR
Jules Richard
BY
Munn & Co
ATTORNEYS

J. RICHARD.
APPARATUS FOR VIEWING STEREOSCOPIC OR OTHER PICTURES.
APPLICATION FILED FEB. 5, 1908.

940,479.

Patented Nov. 16, 1909.

7 SHEETS—SHEET 2.

WITNESSES:

INVENTOR
Jules Richard
BY
Munn & Co
ATTORNEYS

J. RICHARD.
APPARATUS FOR VIEWING STEREOSCOPIC OR OTHER PICTURES.
APPLICATION FILED FEB. 5, 1908.

940,479.

Patented Nov. 16, 1909.
7 SHEETS—SHEET 3.

WITNESSE:
W. M. Avery
J. P. Davis

INVENTOR
Jules Richard
BY
Munn & Co.
ATTORNEYS

J. RICHARD.
APPARATUS FOR VIEWING STEREOSCOPIC OR OTHER PICTURES.
APPLICATION FILED FEB. 5, 1908.
940,479.
Patented Nov. 16, 1909.
7 SHEETS—SHEET 4.
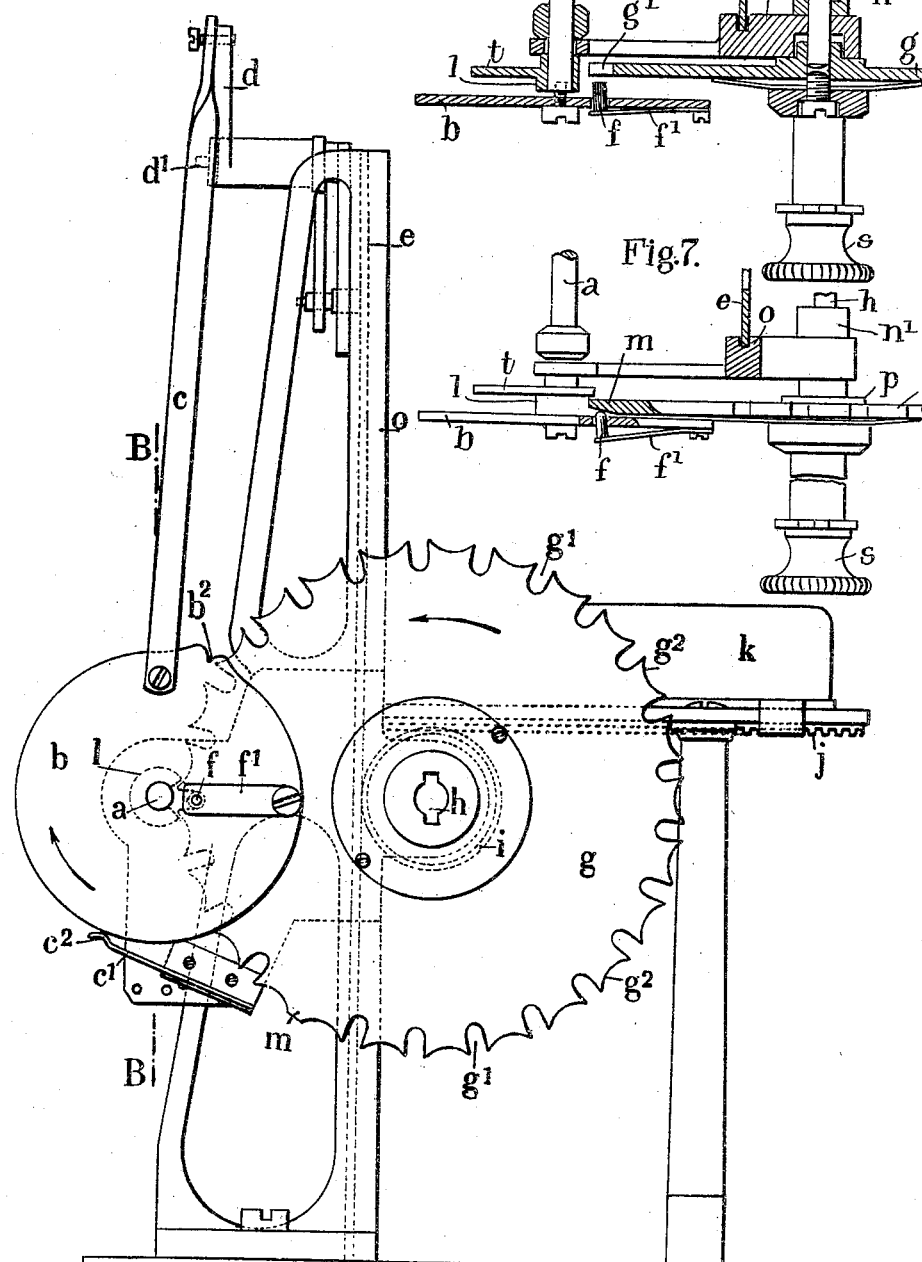

J. RICHARD.
APPARATUS FOR VIEWING STEREOSCOPIC OR OTHER PICTURES.
APPLICATION FILED FEB. 5, 1908.
940,479.
Patented Nov. 16, 1909.
7 SHEETS—SHEET 5.
Fig. 12.
Fig. 8.
Fig. 13.
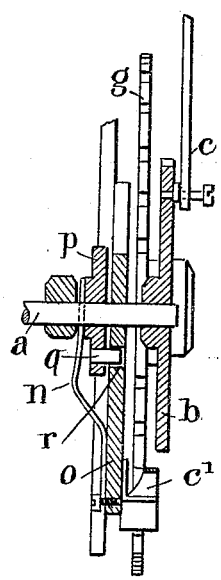
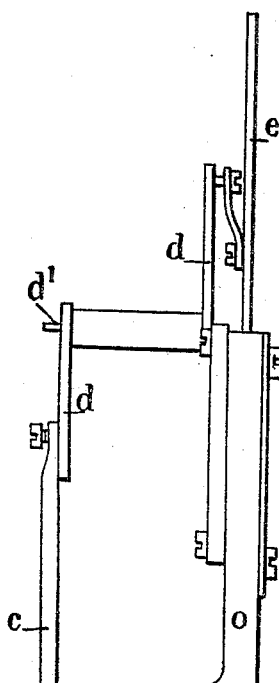
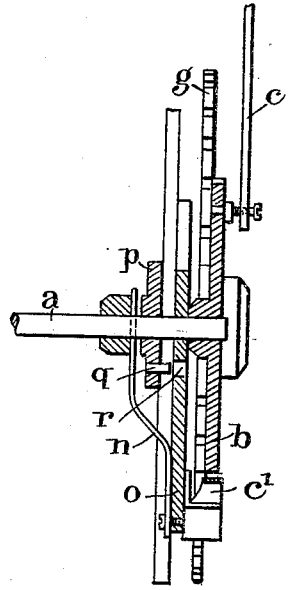
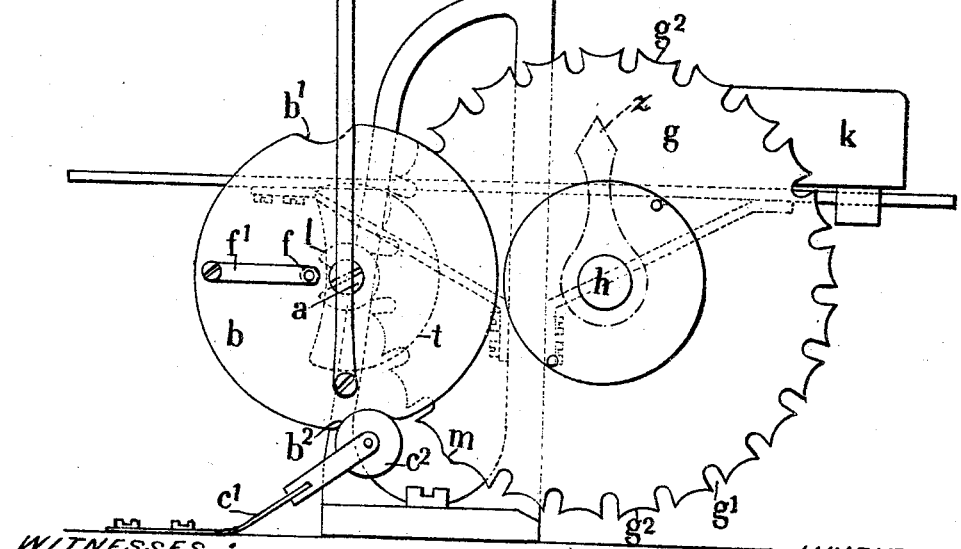
WITNESSES:
W. M. Avery
J. P. Davis
INVENTOR
Jules Richard
BY
Munn & Co.
ATTORNEYS J. RICHARD.
APPARATUS FOR VIEWING STEREOSCOPIC OR OTHER PICTURES.
APPLICATION FILED FEB. 5, 1908.

940,479.

Patented Nov. 16, 1909.
7 SHEETS—SHEET 6.

WITNESSES:
W. M. Avery
J. P. Davis

INVENTOR
Jules Richard
BY
Munn & Co.
ATTORNEYS

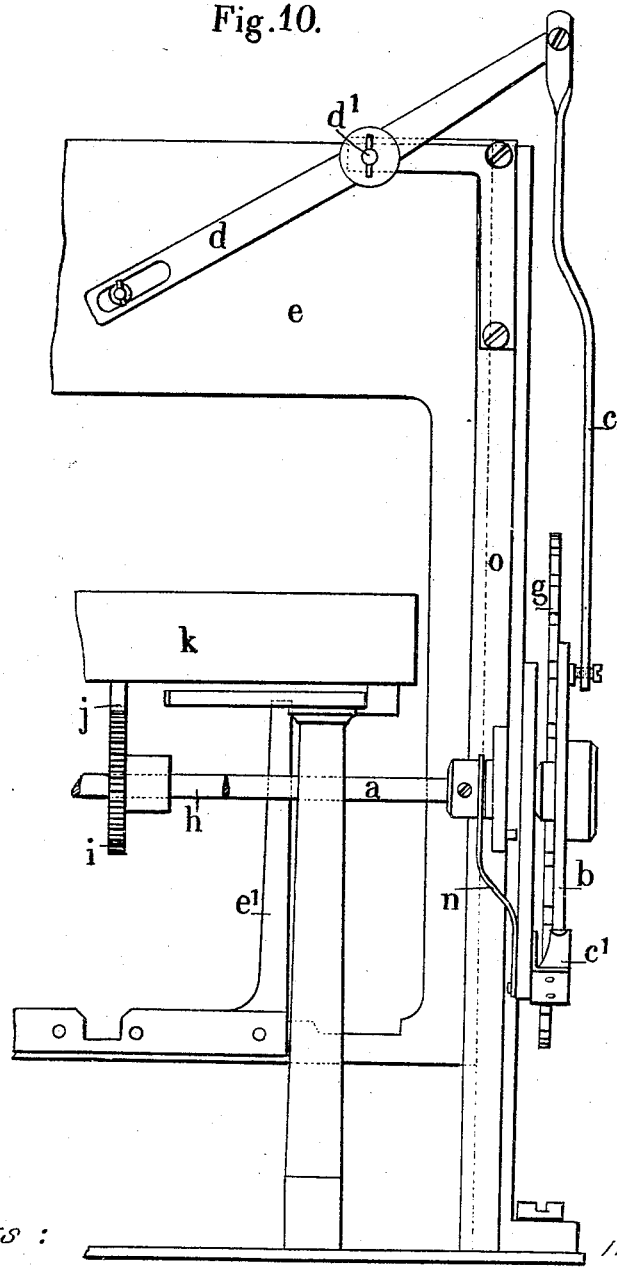

UNITED STATES PATENT OFFICE.

JULES RICHARD, OF PARIS, FRANCE.

APPARATUS FOR VIEWING STEREOSCOPIC OR OTHER PICTURES.

940,479.  Specification of Letters Patent.  Patented Nov. 16, 1909.

Application filed February 5, 1908. Serial No. 414,337.

*To all whom it may concern:*

Be it known that I, JULES RICHARD, a citizen of the French Republic, of 25 Rue Mélingue, in the city of Paris, Republic of France, engineer, have invented Improvements in or Relating to Apparatus for Viewing Stereoscopic or other Pictures, of which the following is a full, clear, and exact description.

This invention relates to apparatus designed to permit of a series of stereoscopic or ordinary views or pictures being observed in succession, the apparatus being also adapted for use for projecting purposes.

The apparatus comprises a horizontally movable carriage carrying a holder or magazine whereby each view in succession is brought into the plane of an upright frame which is capable of being moved vertically to bring one view at a time opposite the eyepieces of the instrument and thereafter return said view to the holder.

The invention is more particularly characterized by mechanism for controlling the movement of the carriage as well as the rising and the return of each of the pictures to the holder. This mechanism consists essentially of a crank-disk, a connecting rod, and a sway-bar for imparting vertical movement to the frame, the crank disk being provided with stop mechanism which holds the frame in its raised position and the picture in place opposite the eyepieces as long as required. Each revolution of the crank disk produces partial rotation of a star wheel which drives by rack and pinion the horizontally movable carriage. By means of the crank disk and star wheel the carriage with the holder for the pictures may be moved in one direction or the other, the carriage advancing to the extent of the distance which separates two consecutive views at each rotation of the disk. The star wheel is provided with an automatic declutching device by means of which it may be released from the action of the crank disk when the carriage reaches the limit of one of its movements. Furthermore, the driving disk may be declutched by means of the star wheel in such manner as to permit of the carriage being returned to its original position, or of displacing it rapidly in one direction or the other. A safety device is provided which prevents declutching until the last picture viewed has been returned to the holder or magazine.

The invention will be described with reference to the accompanying drawings, wherein—

Figure 2:
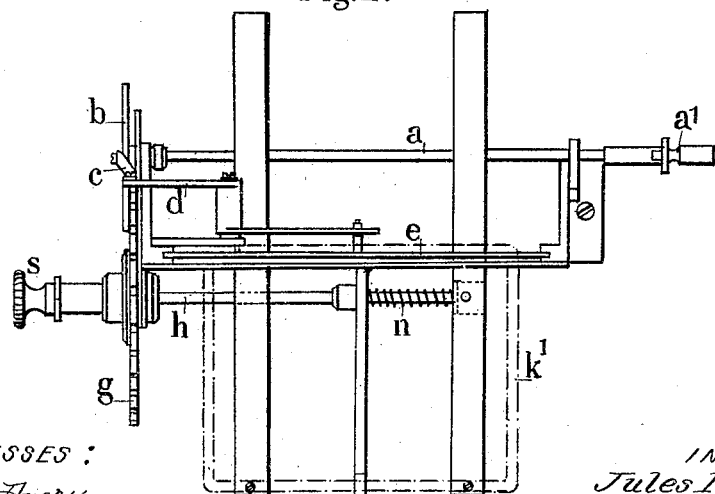
Figure 3:
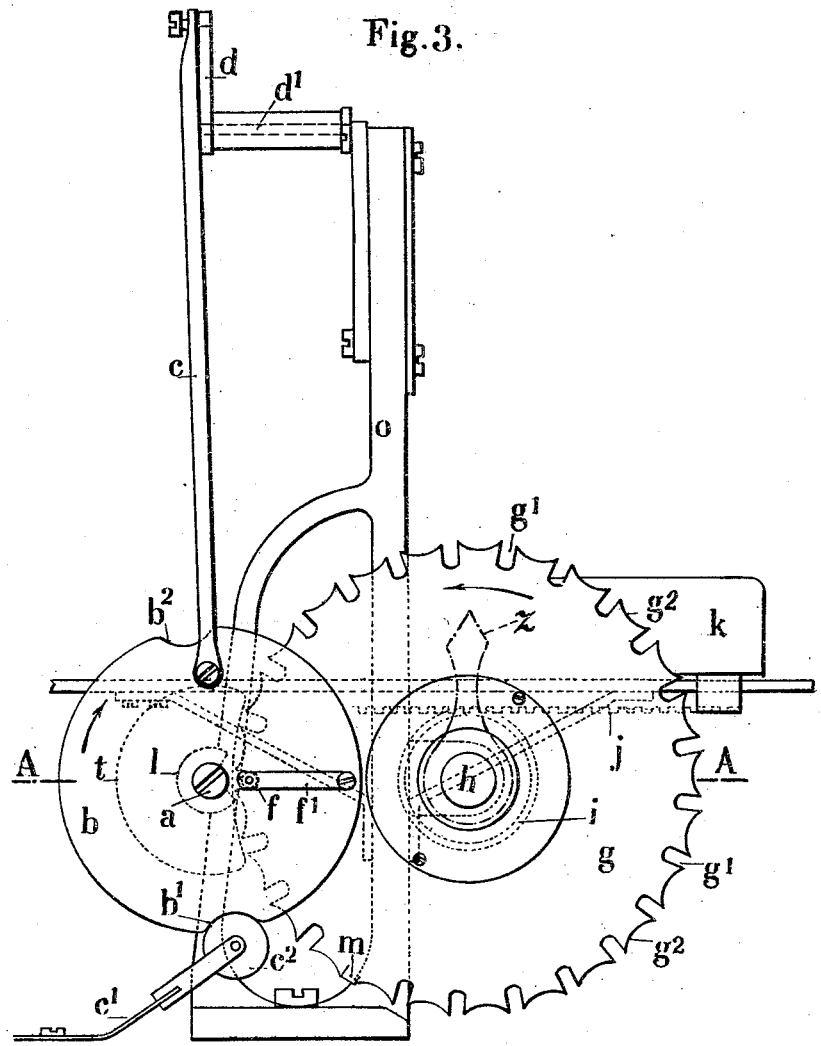
Figure 5:
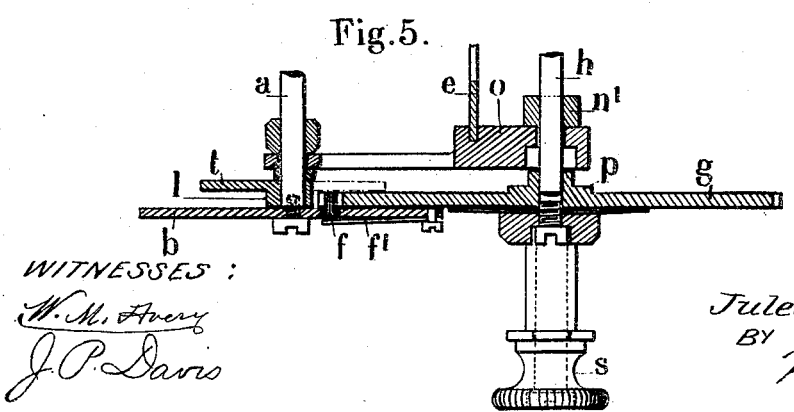
Figure 4:
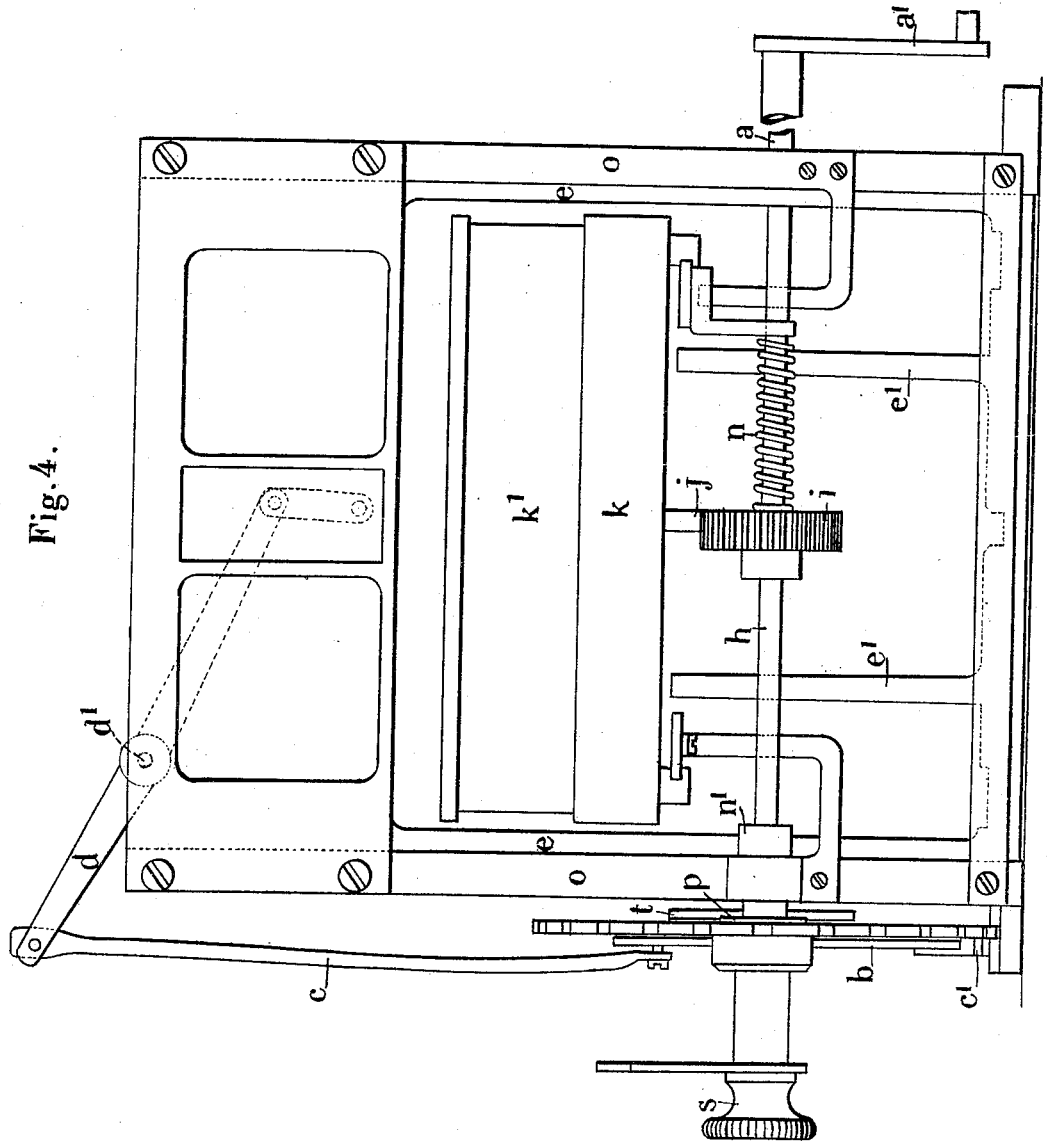
Figure 9:
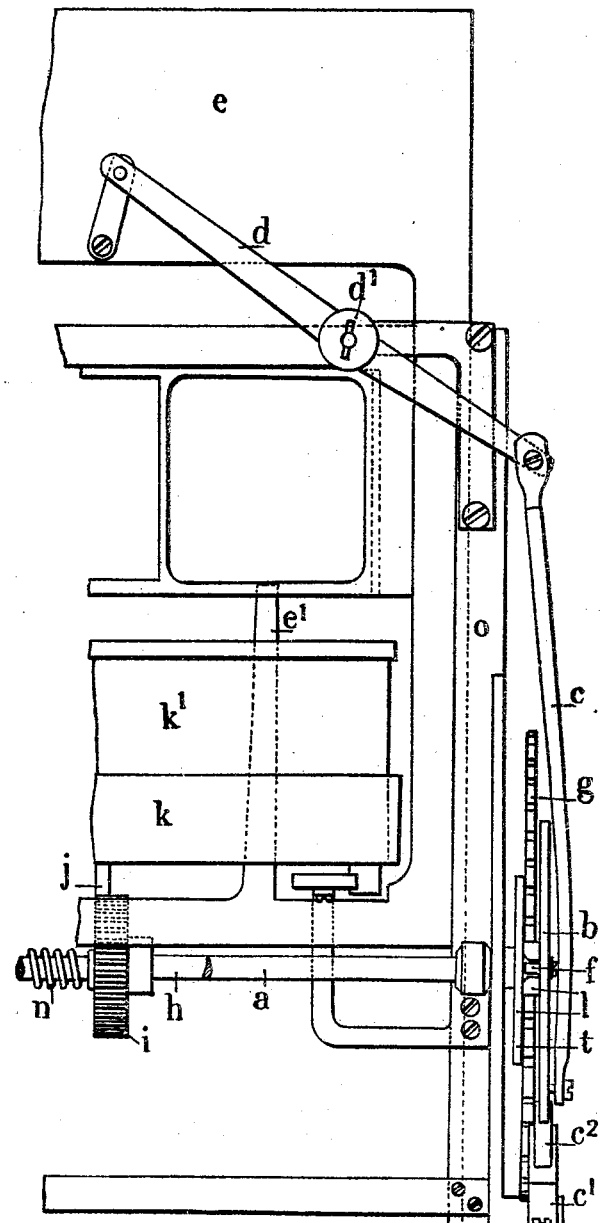

Figure 1 shows the apparatus in front elevation. Fig. 2 shows a plan view, the frame of the instrument being omitted. Figs. 3 and 4 show the mechanism by which the carriage and frame are operated, on a larger scale. Figs. 5, 6 and 7 are horizontal sections on A—A of Fig. 3, showing certain parts of the mechanism in different positions. Fig. 8 is a similar view to Fig. 3, the parts occupying a different position. Fig. 9 is a part rear view corresponding to Fig. 8. Figs. 10 and 11 are similar views to Figs. 9 and 8 respectively showing a modification. Figs. 12 and 13 are sections on B—B of Fig. 11.

As will be seen by reference to Figs. 1 to 9 of the drawings, the apparatus comprises a shaft $a$ provided with a crank handle $a'$ which is preferably frictionally mounted on one end of the shaft whose other extremity is furnished with a crank disk $b$ which operates a rod $c$ and a sway-bar $d$, said sway-bar being mounted to turn upon a stationary support $d'$ and attached to the upright frame $e$ to which it imparts raising and lowering movements. The disk $b$ is formed with notches $b'$, $b^2$ in which a roller $c^2$ carried by a spring $c'$ may engage. The engagement of this roller in one of the notches holds the crank disk stationary. The crank disk $b$ is furnished with a pin $f$ which projects from a flat spring $f'$ and passes freely through the disk so as to project from the inner face of the latter. This pin extends in the path of the teeth of the star wheel $g$ so as to be adapted to engage with the teeth of the latter. The star wheel is keyed on shaft $h$ and carries a pinion $i$ gearing with a rack $j$ in one with a carriage $k$ which receives the picture holder or magazine $k'$.

From the above it will be understood that when the crank handle is moved the rising and falling movements of the frame $e$ is determined by means of the rod $c$ and the arm $d$. When the frame is raised pushers $e'$ in one with the carriage pass into the magazine and lift one of the pictures. At the moment when the frame is at the highest point of its stroke (Fig. 9) (at which time the picture is in line with the eyepieces) the roller $c^2$ falls into the notch $b^2$ of the disk and arrests its rotation. Thereupon the crank handle $a'$ may be released whereupon the picture will remain as long as may be desired in front of the eyepieces. On thereafter again rotating the crank handle $a'$ the roller $c^2$ is released from the notch $b^2$, the crank disk is freed and the frame is lowered and the picture returned to its place in the magazine $k'$. Slightly before the descending movement has been completed immediately after the picture has been returned to the magazine the pin $f$ engages in one of the notches $g'$ of the star-wheel $g$ and turns the latter to the extent of one half tooth interval. The pinion $i$ turns through an equal angle and moves the rack $j$ so as to advance the carriage $k$ and the holder $k'$ to the extent of half the distance which separates two consecutive pictures.

At the beginning of the following movement of the crank handle the pin $f$ produces the rotation of the star wheel and completes the advance of the carriage. At this moment one of the curved recesses $g^2$ of the star wheel comes into contact with the periphery of the shoulder $l$ of the disk $b$ which fixes the star wheel and consequently the carriage $k$ until the following advance movement of the carriage.

It will be seen that the crank handle may be turned in either direction indifferently so as to cause the carriage $k$ to travel in the corresponding direction on its guides. The method of mounting the pin $f$ has for object to produce an automatic declutching between the crank disk $b$ and the star wheel $g$ when the carriage has arrived at the end of its travel. To this end the star wheel is formed with a beveled cam surface $m$ in place of one of the notches $g'$ as will be seen in Fig. 7. When the carriage has arrived at one or the other of the limits of its travel this beveled portion is brought into the path of the pin $f$ which engages with and slides over the bevel and is thereby pressed outward, this movement being permitted by the yielding of spring $f'$ which is also to be seen in Fig. 7. At this moment the crank disk no longer actuates the star wheel, so that the mechanism is not subject to the risk of injury if, through inadvertence, the operator should continue to rotate the crank disk in the same direction after the carriage has arrived at the end of its travel. Moreover the star wheel can be declutched at will from the crank disk at the moment when the frame is at the bottom of its stroke, and when, consequently, no picture is engaged by the frame. To this end the shaft $h$ on which the star wheel is carried, is mounted so as to be longitudinally displaceable in its supports. A spring $n$ tends to hold this shaft toward the left (Fig. 4) so as to retain the shoulder $n'$ against the support $o$, in which position the star-wheel and disk are in gear with one another through the medium of the pin $f$. The shaft $h$ can be shifted toward the right by pressing a button $s$ so that the crank disk will cease to gear with the star wheel and, as the pinion $i$ is sufficiently wide to still remain in engagement with the rack $j'$ the carriage $k$ can be moved at will in one direction or the other and to desired extent by turning the button $s$. By this means the carriage can be returned to its initial position, or any particular picture can be brought into the plane of the vertically movable frame for examination.

The declutching operation can only be performed however, when the frame is in the completely lowered position and when the pictures are in the magazine. This result is insured by means of the sector $t$ in one with the disk $b$. This sector, as will be seen by reference to Figs. 5 and 6, is presented in the path of the star-wheel when the latter is displaced for declutching, and cannot be rotated unless its recess is concentric with the star wheel and occupies the position shown in Fig. 3, in which the vertically movable frame is in the lowered position. On the other hand, in the position shown in Fig. 8 where the frame is raised, declutching is not possible.

After the declutching operation has been performed as above explained, when the star wheel subsequently resumes its normal position under the action of the spring, it may happen that a notch is not presented opposite the pin $f$. In such circumstances the spring $f'$ yields and permits the pin $f$ to remain out of engagement with the star wheel. On afterward turning the crank handle in either direction, the pin $f$ again falls into one of the notches $g'$ without difficulty.

Figs. 10 to 13 show a modification of the apparatus. In this arrangement the declutching of the star wheel is obtained by the longitudinal displacement in its bearings, of the shaft $a$ carrying the crank handle $a'$. This shaft it pressed toward the left in Fig. 10 by a spring $n$. In this position the disk $b$ drives the star wheel by the pin $f$. The shaft $a$ may be displaced toward the right by pressing on the crank handle $a'$, mounted on the opposite extremity of the shaft, until the collar $p$, fast on the shaft $a$, abuts against the support $o$. As in the previous case this displacement cannot take place until the vertically movable frame has been lowered, for the reason that the shoulder $p$ is provided with a stud $q$ which abuts against the support $o$ and prevents the displacement of the shaft unless said stud is presented opposite to a hole $r$ in the support, which it can thus enter, the stud registering with this hole at the moment when the frame is lowered.

The new arrangement, which is exceedingly simple, presents the advantage of permitting the carriage with the holder carrying the pictures to be moved with equal facility in either direction by correspondingly rotating the crank handle.

The pointer $z$ in Figs. 3 and 8 is for the purpose of indicating when the magazine is in proper position for lifting the first picture, the pointer at this time being vertical.

The spring $c'$ with a projection $c^3$ shown in Figs. 10 to 13 is adapted to engage with the notch $b^2$ of the wheel $b$ and to render the same immovable.

Claims:

1. In an apparatus for the successive observing or examination of pictures, the combination of a box containing the pictures, a mechanism for producing a horizontal displacement of said box, a frame having vertical movement for the purpose of raising and lowering the pictures, a notched wheel for advancing the picture box, a crank driving plate adapted to be rotated continuously in one direction or the other, a pin carried by the plate and engaging the notches of the wheel, a connecting rod, and an arm connecting the vertical frame and the rod.

2. In an apparatus for the successive observing of pictures, the combination of a mechanism producing a horizontal movement of the picture containing box, a mechanism producing the vertical movement of the frame for raising the pictures, a notched wheel determining the movement of the box and of the frame, a rotatable plate, a pin carried by the plate and engaging the notches of the wheel, a contrivance for stopping the driving plate at each half revolution.

3. In an apparatus for the successive observing of pictures, the combination of a box containing the pictures, a vertically movable frame for raising and lowering the pictures, a notched wheel determining the movements of the box and of the frame, a driving plate, and a pin on the plate the notched wheel having a cam surface for engaging under said pin to disengage said pin.

4. In an apparatus for the successive observing of pictures, the combination of a box containing the pictures, a vertically movable frame for raising and lowering the pictures, a notched wheel determining the movements of the box and of the frame, a driving plate, a shaft, a pin carried by said plate, a notched wheel keyed on the shaft capable of being displaced longitudinally and a return spring for said shaft.

5. In an apparatus for the successive observing of pictures, the combination of a box containing the pictures, a vertically movable frame for raising and lowering the pictures, a notched wheel determining the movements of the box and of the frame, a driving plate, a shaft, a pin carried by said plate, a notched wheel keyed on a shaft capable of being longitudinally displaced, a return spring for said shaft, and a contrivance for preventing the displacing of the shaft carrying the notched wheel, except when the vertical frame is at the lower end of its travel.

The foregoing specification of my improvements in or relating to apparatus for viewing stereoscopic or other pictures signed by me this 21st day of February, 1908.

JULES RICHARD.

Witnesses:
H. C. COXE,
MAURICE H. PIGNET.